United States Patent [19]  
Shinoda et al.

[11] 4,383,749  
[45] May 17, 1983

[54] AUTOMATIC EXPOSURE CONTROL SYSTEM

[75] Inventors: Nobuhiko Shinoda, Tokyo; Nobuaki Sakurada, Yokohama, both of Japan

[73] Assignee: Canon Kabushiki Kaisha, Tokyo, Japan

[21] Appl. No.: 154,537

[22] Filed: May 30, 1980

Related U.S. Application Data

[63] Continuation of Ser. No. 967,099, Dec. 7, 1978, abandoned.

[30] Foreign Application Priority Data

Dec. 8, 1977 [JP] Japan .............................. 52-147599

[51] Int. Cl.³ ........................................... G03B 7/095
[52] U.S. Cl. .................................... 354/23 D; 354/38
[58] Field of Search ................... 354/23 D, 38, 60 A, 354/289

[56] References Cited

U.S. PATENT DOCUMENTS 3,964,073 6/1976 Kobori et al. ........................ 354/38
4,037,233 7/1977 Shinoda et al. ................... 354/23 D
4,054,887 10/1977 Holle et al. ....................... 354/23 D
4,079,386 3/1978 Murakami et al. ............... 354/23 D
4,079,387 3/1978 Kaamura et al. ................. 354/23 D
4,089,011 5/1978 Date et al. ........................ 354/23 D
4,090,208 5/1978 Shinoda et al. .................. 354/23 D Primary Examiner—Stafford D. Schreyer
Attorney, Agent, or Firm—Toren, McGeady and Stanger

[57] ABSTRACT

The disclosed control system controls the diaphragm aperture of a camera in accordance with a preselected shutter time. A diaphragm scanner produces one pulse for each change of one stop in the size of aperture opening. When the required value of the diaphragm aperture, as determined in Apex form, is a number having an integer and a decimal fraction, the diaphragm aperture is adjusted in accordance with the integer, and the shutter time is adjusted to a value obtained by factoring the decimal fraction into the preset value of shutter time. Corresponding adjustment of the shutter time assures a one-eighth-stop accuracy in exposure control despite the diaphragm aperture being varied in one-stop increments.

10 Claims, 4 Drawing Figures

FIG.3

| TV | SHUTTER TIME (SEC.) | COUNTER OUTPUT STAGES | PERIOD OF PULSE | EQUIVALENT SHUTTER TIME |
|---|---|---|---|---|
| -5 | 30 | $Q_{16}$ | $2^{16}T_1$ | $16 \times 2^{16}T_1$ |
| -4 | 15 | $Q_{15}$ | $2^{15}T_1$ | $16 \times 2^{15}T_1$ |
| -3 | 8 | $Q_{14}$ | $2^{14}T_1$ | $16 \times 2^{14}T_1$ |
| -2 | 4 | $Q_{13}$ | $2^{13}T_1$ | $16 \times 2^{13}T_1$ |
| -1 | 2 | $Q_{12}$ | $2^{12}T_1$ | $16 \times 2^{12}T_1$ |
| 0 | 1 | $Q_{11}$ | $2^{11}T_1$ | $16 \times 2^{11}T_1$ |
| 1 | 1/2 | $Q_{10}$ | $2^{10}T_1$ | $16 \times 2^{10}T_1$ |
| 2 | 1/4 | $Q_9$ | $2^9 T_1$ | $16 \times 2^9 T_1$ |
| 3 | 1/8 | $Q_8$ | $2^8 T_1$ | $16 \times 2^8 T_1$ |
| 4 | 1/15 | $Q_7$ | $2^7 T_1$ | $16 \times 2^7 T_1$ |
| 5 | 1/30 | $Q_6$ | $2^6 T_1$ | $16 \times 2^6 T_1$ |
| 6 | 1/60 | $Q_5$ | $2^5 T_1$ | $16 \times 2^5 T_1$ |
| 7 | 1/125 | $Q_4$ | $2^4 T_1$ | $16 \times 2^4 T_1$ |
| 8 | 1/250 | $Q_3$ | $2^3 T_1$ | $16 \times 2^3 T_1$ |
| 9 | 1/500 | $Q_2$ | $2^2 T_1$ | $16 \times 2^2 T_1$ |
| 10 | 1/1000 | $Q_1$ | $2T_1$ | $16 \times 2T_1$ |

AUTOMATIC EXPOSURE CONTROL SYSTEM

This is a continuation of application Ser. No. 967,099, filed Dec. 7, 1978, abandoned.

BACKGROUND OF THE INVENTION

1. Field of the Invention

This invention relates to automatic exposure control systems for photographic cameras, and more particularly to digital exposure control systems for controlling the diaphragm aperture of a camera in accordance with a preselected shutter time.

2. Description of the Prior Art

In a known automatic exposure control system the setting of a desired shutter time is followed by derivation of a proper exposure value to which the diaphragm aperture of a camera is adjusted by a control mechanism. Though the exposure value is obtained to a three-figure accuracy, the use of the control mechanism causes the actual diaphragm value to deviate from the exposure value by about a half stop. For example, let it be assumed that the object brightness level Bv, the preselected shutter time Tv, the sensitivity of used film Sv and the full open aperture Avo are:

$Bv = 4.25$, $Tv = 7$, $Sv = 5$, and $Avo = 1$.

Then, based on the following formula in the Apex system, the number of stops Avs the diaphragm is to be closed down from the full open aperture is:

$$\begin{aligned} Avs &= Bv - Tv + Sv - Avo \\ &= 4.25 - 7 + 5 - 1 \\ &= 1.25 \end{aligned}$$

Therefore, the diaphragm of the camera must be closed down 1.25 stops from the fully open position. If the diaphragm control mechanism operates with an accuracy of 0.5 stops, the actual size of diaphragm aperture is taken at either one stop or one and a half stops down from the fully open position. Hence the risk of exposure error is 0.25 stops.

In another conventional exposure control system, when the computed exposure value exceeds the limits of the dynamic range of diaphragm control, the excess fraction of the exposure value is fed back to alter the preset value of shutter time to produce a correct exposure. However, such adjustment of the shutter time occurs only when the exposure value falls outside the dynamic range of diaphragm control. Accordingly, the above-described risk of exposure error is not reduced to any significant extent.

SUMMARY OF THE INVENTION

It is an object of the present invention to provide an automatic exposure control system for a camera equipped with a shutter preselection automatic diaphragm control range which overcomes the afore-mentioned drawbacks. According to the invention, this is done by feeding that fraction of the exposure value which exceeds the accuracy of diaphragm control back to alter the preset value of shutter time. This makes it possible to effect a far more accurate exposure than has heretofore been possible.

In connection with the aforesaid numerical example, it should be explained that the exposure value Avs in the form $Avs = Bv + Sv - Tv - Avo = 1.25$ has a decimal fraction, say 0.25, which exceeds the 0.5 stop accuracy of the diaphragm control. Therefore, this decimal fraction is factored into the preselected shutter time. In the Apex system, this means $7 + 0.25 = 7.25$. Thus, the shutter time is adjusted to 7.25, to effect an equivalent high accuracy exposure.

Another object of the present invention is to provide a digital exposure control system. According to the invention this is done by deriving an exposure value in analog form in accordance with the object brightness, film sensitivity, and the preselected shutter time, and converting the exposure value to a number whose first part within the accuracy of diaphragm control is stored in a first binary counter and whose second part beyond the accuracy of diaphragm control is stored in a second binary counter. The diaphragm aperture and shutter time of the camera are adjusted in accordance with the first and second counters respectively to improve the accuracy of exposure control.

These and other features of the invention are pointed out in the claims. Other objects and advantages of the present invention will become apparent from the following detailed description taken in conjunction with the accompanying drawings.

BRIEF DESCRIPTION OF THE DRAWINGS

In the drawings:

FIG. 3 is a table of shutter time values related to frequencies of pulse trains for adjustment of shutter time.

DESCRIPTION OF PREFERRED EMBODIMENT

Figure 1:
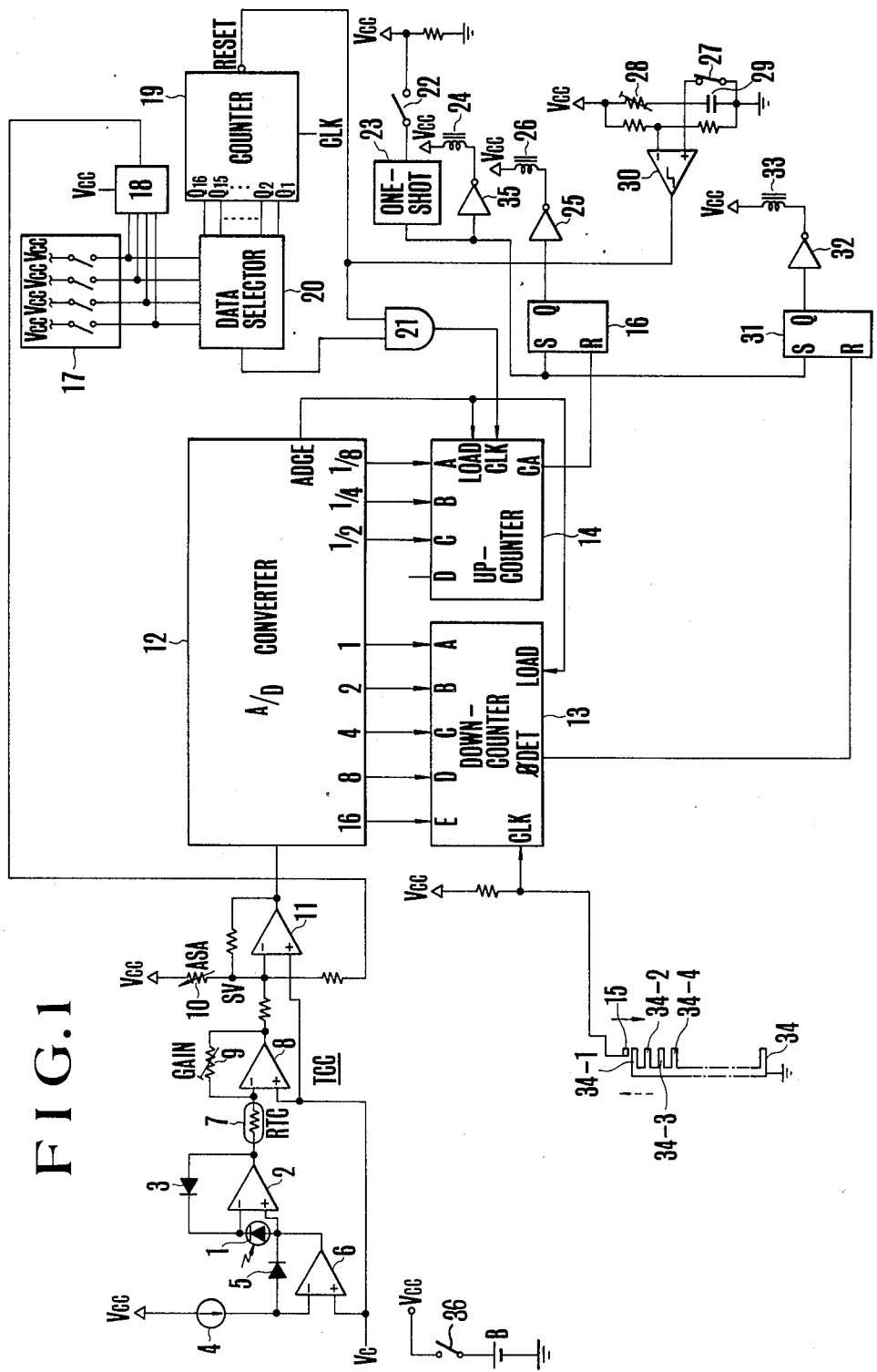
FIG. 1 is a schematic electrical circuit diagram, partly in block form, of a digital exposure control system embodying the present invention.

FIG. 1 illustrates an automatic exposure control circuit for controlling the diaphragm of a single lens reflex camera embodying the present invention and adapted to operate in a full open aperture light metering mode. In this circuit, a sensor which comprises a photo-sensitive element 1 such as silicon photo-cell SPC is connected between the two inputs of an operational amplifier 2, and a diode 3 is connected in the feedback network of the amplifier 2. The sensor 1 senses the brightness of an object to be photographed at full open aperture. The sensor circuit 1,2,3 responds to the brightness of the object to be photographed, and produces an output voltage based on the formula: $Bv - Avo$. A temperature compensating circuit TCC compensates for temperature variations in the output of the sensor circuit 1,2,3. The circuit TCC comprises a constant current source 4, a diode 5 connected between the output of the source 4 and the non-inverting input of the operational amplifier 2, an operational amplifier 6 with its inversion input and its output connected across the diode 5, and a thermistor 7 connected between the output of the sensor and an inversion input of an operational amplifier 8. The latter forms a gain control circuit GAIN with a variable resistor 9.

The voltage at the output of the gain control circuit GAIN is combined with voltages representative of the sensitivity of the film used and the preselected shutter time value. These latter two voltages are established by a variable resistor 10 and a digitally operated shutter time setting circuit 17 with a digital-to-analogue converter 18. The voltages are combined by an adder circuit, which includes an operational amplifier 11, to produce an output voltage representative of an exposure value in terms of Avs, because $Bv+Sv=Tv+Av=Avo+Avs+Tv$. For example, when the given object has a brightness as sensed by SPC to be 4.25 in the Apex system, the ASA sensitivity of the used film is 100, or $Sv=5$, the preset value of shutter time is 1/125 second, or $Tv=7$, and the F-number of the camera objective lens is 1.4, or $Avo=1$, then the number of stops closed down from the full open aperture position is 1.25.

Figure 4:
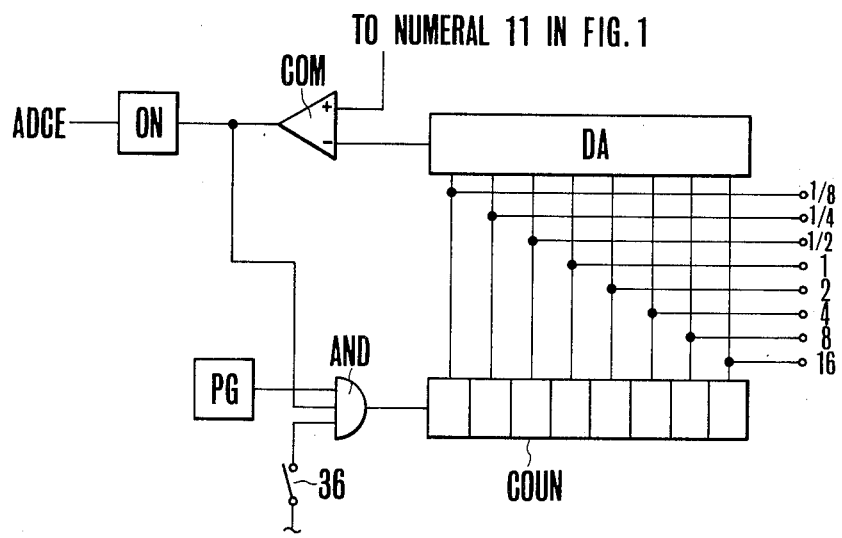
FIG. 4 is an electrical circuit diagram showing details of the analog-to-digital converter of FIG. 1.

An analogue-to-digital converter 12 that is connected to the output of the adder circuit 11 has eight output stages weighted 16, 8, 4, 2, 1, $\frac{1}{2}$, $\frac{1}{4}$, and $\frac{1}{8}$, so that the analogue output of the adder circuit 11 is converted to a digital output with an accuracy of one-eighth stop. As shown in FIG. 4, the analogue-to-digital converter 12 is of the follow-comparison type and includes a pulse generator PG and an 8-bit binary counter COUN with an input connected to the output of the pulse generator PG through an AND gate AND. A ladder circuit DA has eight inputs connected to the respective output stages of the counter COUN. A comparator COM compares the output of the ladder circuit DA with the output of the adder circuit 11. Upon coincidence it gates off the gate AND. A one-shot circuit ON responds to the output of the comparator COM for producing a pulse which is applied from an output terminal ADCE to both LOAD inputs of first and second memory means, FIG. 1, i.e. a 5-bit down-counter 13 and a 4-bit up-counter 14 respectively. The down-counter 13 has five inputs A to E connected to the output stages 1, 2, 4, 8 and 16 of the A/D converter 12 and stores the integer of the exposure value, as a pulse former 15 produces one pulse for each stop the diaphragm aperture departs from the full open aperture position. The decimal fraction of the exposure value is stored in the up-counter 14 to alter the preset shutter time value.

Figure 2:
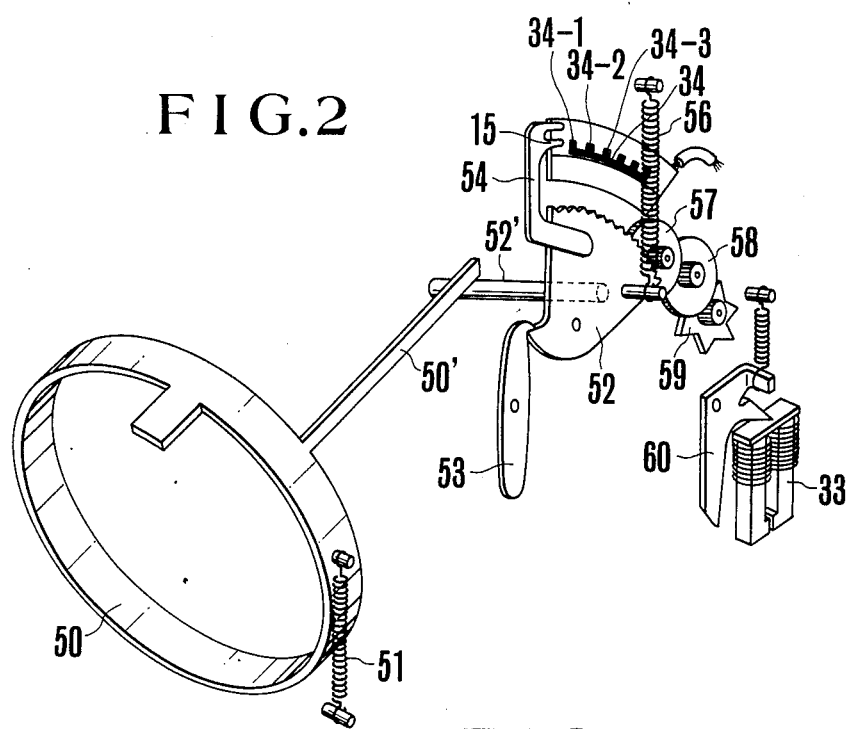
FIG. 2 is a perspective view of an example of a diaphragm scanning mechanism with a pulse former constituting part of the system of FIG. 1.

FIG. 2 shows a control mechanism for the pulse former 15 associated with a lens aperture mechanism, which includes a diaphragm presetting ring 50. The ring 50 has a longitudinally rearwardly extending arm 50' abuttingly engaging a pin 52' of a sector gear 52 biased up by a spring 51. When a pawl lever 53 is turned counter-clockwise it disengages from the sector gear 52. The spring 51 is strong enough to overcome the effect of a return control spring 56. Hence the spring 51 now causes the scanning member 15 radially extending from the sector gear 52 to start sliding clockwise along an arcuate track 34 of a comb-like conductive pattern of contacts 34-1, 34-2, 34-3, etc., while the diaphragm presetting ring 50 is turned in a clockwise direction about the optical axis of the objective lens. Since the number of aperture stops closed down from the full open position is translated to the corresponding number of pulses produced from the pulse former 15, and applied to a CLK input of the down-counter 13, the content of the down-counter 13 is decreased by one for each pulse applied. When the content of counter 13 reaches zero an electromagnet 33 is de-energized and a lever 60, engaging one of the teeth of a star gear 59, arrests the diaphragm scanning mechanism.

The values of shutter time available on a shutter dial associated with the circuit 17 ranges from 30 seconds, or $Tv=-5$, to 1/1000 second, or $Tv=10$. Hence Tv varies from $-5$ to 10.

To achieve a $\frac{1}{8}$ stop accuracy in corresponding adjustment of shutter time, the value Tv must be found by the following formula:

$$Tv=i+f/8; \quad -5\leq i\leq 10; \quad 0\leq f\leq 7 \tag{1}$$

where i and f are integers.
The actual interval of shutter time, i.e. shutter time, may be expressed as:

$$T=2^{-Tv} \tag{2}$$

By substituting formula (1) for Tv in formula (2), we have $$T=2^{-(i+f/8)}=2^{-(i+1)}\cdot 2^{(1-f/8)} \tag{3}$$

Letting $2^a$ be approximated by $A(1+a)$ where $0\leq a\leq 1$, formula (3) becomes $$T=2^{-(i+1)}\cdot(2-f/8)\cdot A=2^{-(i+4)}\cdot A\cdot(16-f) \tag{4}$$

Therefore, it is necessary to make use of a pulse train whose period (Tcnt) is $2^{-(i+4)}A$ when the preset value of shutter time is $2^{-i}$ seconds. The sum of (16−f) pulses becomes equal to the actual shutter time interval.

Because the value Tv varies from −5 to 10, a range of 15, the system of FIG. 1 contemplates the use of a single clock pulse generator CLK for a period T1 of $2^{-15}A$ in combination with a frequency divider or counter 19 having sixteen output stages Q1 to Q16 which are weighted $2^{(11-Tv)}$ as shown in FIG. 3. In response to the digital output of the shutter time setting circuit 17, a circuit 20 selects the one of the outputs Q1 to Q16 of the counter 19 which depends upon the preset value of shutter time for connection to a CLK input of the up-counter 14 through an AND gate 21. This circuit 20 is a DATA SELECTOR available, for example, from Texas Instruments Inc. under the designation SN54150.

When a shutter release button (not shown) is depressed to a first position, a switch 36 is closed to supply electrical power Vcc from a battery Bcc to the various portions of the circuit of FIG. 1. Further depression to a second position closes a switch 22 and causes a one-shot circuit 23 to produce an actuating pulse which is applied through an inverter 35 to instantaneously energize the winding of an electromagnet 24 which controls actuation of the shutter of the camera. The one-shot circuit 23 also sets flip-flops 16 and 31 so their outputs Q change to a binary "1" level. These "1" levels are inverted to binary "0" levels by inverters 25 and 32 and applied to the winding of an electromagnet 26 and the winding of an electromagnet 33 respectively. Because an end of each of the windings of electromagnets 26 and 33 is connected to a positive potential, the "0" binary levels energize the electromagnets, so the rear curtain of the shutter is held in the cocked position and the lever 60 (FIG. 2) is held out of contact with the star wheel 59. Energization of the electromagnet 24 by the one shot circuit 23 causes disengagement of the pawl lever 53 from the sector gear 52. The spring 51, which overcomes the return control spring 56, now starts movement of the presetting ring 50 and hence the scanning member 15.

Assuming, as mentioned, that the digital exposure value in terms of Avs is 1.25, then a binary "1" signal appears at the output stages 1 and $\frac{1}{4}$ of the analogue-todigital converter 12. Hence the content of the down-counter 13 is 00001, and the content of the up-counter 14 is 0010. When the diaphragm presetting ring 50 has rotated from the fully open aperture position for a diaphragm value of 1.4 through an angular distance corresponding to a one-stop decrease in the size of diaphragm aperture, the scanning member or slider 15 arrives at the first combtooth like contact 34-1 and produces a pulse. The resulting pulse is applied to the CLK input of the down-counter 13, and causes the content 00001 to be changed to 00000, so that a "1" signal appears at an output stage ODET of the counter 13. This signal appears at the "RESET" input of the flip-flop 31 which responds by producing a "0" output at Q. The inverter 32 then applies a "1" signal to the winding of electromagnet 33. The magnetic winding 33 is thus de-energized and the lever 60 arrests the diaphragm scanning mechanism. Thus, the deflected position of the diaphragm presetting ring 50 is translated to the proper diaphragm aperture based on the integer of the exposure value when diaphragm blades (not shown) are closed down by an automatically operated member.

After the automatic positioning of the diaphragm has been completed, a front curtain (not shown) of the shutter starts to run down and, at the same time, a switch 27 is opened to start charging of a timing capacitor 29 through a semi-adjustable resistor 28. In the cocked position, the front and rear shutter curtains overlap each other at their respective trailing and leading borders. Thus, when the trailing border of the front curtain is moved away from the leading border of the rear curtain to start opening of an exposure aperture, the output of the timing circuit 28 and 29 reaches a threshold level for a comparator 30. The comparator 30 then produces a "1" binary output which is applied to the counter 19 and the gating control input of the AND gate 21. As a result the counter 19 is released from its reset state, and the gate 21 is gated on to pass a pulse train from the data selector 20 to the CLK input of the up-counter 14.

Because the preset value of shutter time is 1/125 second, the period of pulse train selected by the data selector 20 is $2^4 T_1$ as shown in FIG. 3. When fourteen pulses are counted by the up-counter 14, a "1" signal appears at a "CARRY" output stage CA of the up-counter 14 and is applied to the "RESET" input of the flip-flop 16. The latter now flips over, and produces a "0" at Q and a "1" at the output of inverter 25. This causes the winding of electromagnet 26 to be de-energized which in turn causes the rear curtain to run down to terminate the exposure. The sum of fourteen pulses is shorter than 1/125 second by $2 \times 2^4 T_1$ because the decimal fraction of the exposure value is factored into the shutter time. In other words, the 0.25 stop error of diaphragm control is compensated for by adjusting the shutter time so it deviates from the preset value of shutter time by an amount corresponding to the error.

The difference of two pulses between the maximum of 16 pulses and the 14 pulses delivered, represents the value f in equations (1) and (4) and the value ¼ in the A-D converter 12. Because f varies between 0 and 7, and the up-counter 14 can count from 9 pulses to 16 pulses. Hence the shutter speed can be decreased from its set stop, 0 to ⅞ of one stop. In the aforementioned example, it is decreased 2/8 or ¼ stop.

The Texas Instruments Inc. SN54150 data selector is described in the Texas Instruments Inc. handbook entitled "TTL Data Book for Design Engineers" published in 1976 on pages 7-157 to pages 7-160. The outputs Q1 to Q16 of counter 19 are connected to the input terminals E0–E15 of the data selector. The outputs of setting circuit 17 are connected to terminals A, B, C, and D of the data selector. The AND gate 21 receives an input from data selector output terminal W.

The present invention provides a method of improving the accuracy of exposure control while permitting the diaphragm aperture to be controlled at one-stop increments in accordance with the exposure value and the preselected shutter time.

Although the invention has been shown in connection with a specific embodiment, it will be readily apparent to those skilled in the art that various changes in form and arrangement of parts may be made; or the invention otherwise embodied without departing from the spirit and scope of the invention.

What is claimed is:
1. An exposure control device for a camera comprising:
   (a) a light measuring circuit for producing an output corresponding to an object brightness;
   (b) shutter speed input means for presetting shutter speed information;
   (c) a diaphragm signal forming circuit for producing an output corresponding to the output from said light measuring circuit and the shutter speed information of said shutter speed input means;
   (d) a diaphragm control mechanism for defining the value of a diaphragm aperture, said mechanism having a predetermined diaphragm control accuracy and being arranged for regulating the aperture value, in step units of the aperture value, corresponding to said accuracy;
   (e) a memory circuit having a first memory portion for memorizing one divided part of a digital value of said diaphragm signal forming circuit output corresponding to the step units and having a second memory portion for memorizing an other part of the digital value of said diaphragm signal forming circuit output corresponding to values of less than a step unit, so that pre-divided parts of the digital value are memorized separately in the first memory portion and the second memory portion;
   (f) a diaphragm control circuit connected to the first memory portion of said memory circuit for controlling said diaphragm control mechanism on the basis of the memorized value memorized in said first memory portion, irrespective of the value memorized in the second memory portion; and
   (g) a shutter time control circuit for controlling the shutter time on the basis of said shutter speed information in said shutter speed input means and the memorized value memorized in said second memory portion including values less than a step unit, irrespective of the value memorized in the first memory portion.

2. An exposure control device for a camera comprising:
   (a) a light measuring circuit for producing an output corresponding to the object brightness;
   (b) shutter speed input means for presetting shutter speed information;
   (c) a diaphragm signal forming circuit for producing a digital value, said digital value corresponding to the output from said light measuring circuit and the shutter speed information of said shutter input means;

(d) a diaphragm control mechanism for defining a value of a diaphragm aperture, said mechanism having a predetermined diaphragm control accuracy and regulating the aperture value in predetermined diaphragm step units corresponding to the given accuracy;

(e) a memory circuit having first and second memory portions for memorizing the digital value, said first memory portion being arranged for memorizing a first part of said digital value which corresponds to a number of step units within the accuracy of adjustment controllable by said diaphragm control mechanism, said second memory portion being arranged for memorizing the part of said digital value other than that memorized in said first memory portion so that the first part and the other part of the digital value are separately memorized in the first and second memory portions;

(f) a diaphragm control circuit connected to the first memory portion of the memory circuit for controlling said diaphragm control mechanism in accordance with the digital value memorized in said first memory portion, irrespective of the digital value memorized in the second memory portion; and (g) a shutter time control circuit for controlling the shutter time in accordance with the digital value memorized in said second memory portion and said shutter speed information in said shutter speed input means, irrespective of the digital value memorized in said first memory portion.

3. An exposure control device for a camera according to claim 2, wherein said shutter time control circuit has a pulse signal forming circuit for producing pulses of a predetermined period, and said second memory portion is a counter for counting the pulses from said pulse signal forming circuit upon attainment of the content of the counter to a predetermined value to produce a shutter closing signal.

4. An exposure control device according to claim 3, wherein said pulse signal forming circuit determines the frequency of its output pulses on the basis of the shutter speed information of said shutter speed input means.

5. An exposure control device for a camera comprising:

(a) a light measuring circuit for producing an output corresponding to the object brightness;

(b) shutter speed input means for presetting shutter speed information;

(c) a diaphragm signal forming circuit for producing an output corresponding to the output from said light measuring circuit and the shutter speed information of said shutter speed input means;

(d) an analogue-to-digital conversion circuit for converting said output value from said diaphragm signal forming circuit into a digital value;

(e) a diaphragm control mechanism for defining the value of a diaphragm aperture; said mechanism having a predetermined diaphragm control accuracy and regulating the aperture value in predetermined diaphragm step units corresponding to a given accuracy;

(f) a memory circuit having first memory and second memory portions for memorizing the digital value, said first memory portion being arranged for memorizing a part of said digital value which corresponds to the number of step units within the accuracy of adjustment controllable by said diaphragm control mechanism, and said second memory portion being arranged for memorizing a part of said digital value other than that memorized in said first memory portion, so that the part of the digital value corresponding to the number of step units and the other part are separately memorized in the first and second memory portions;

(g) a diaphragm control circuit connected to the first memory portion of the memory circuit for controlling said diaphragm control mechanism in accordance with the digital value memorized in said first memory portion, irrespective of the digital value memorized in the second memory portion; and (h) a shutter time control circuit for controlling the shutter in accordance with the digital value memorized in said second memory portion and said shutter speed information.

6. An exposure control device for a camera comprising:

(a) a light measuring circuit for producing an output corresponding to the object brightness;

(b) shutter speed input means for presetting shutter speed information;

(c) a diaphragm signal forming circuit for producing an output corresponding to the output from said light measuring circuit and the shutter speed information of said shutter speed input means;

(d) an analogue-to-digital conversion circuit for converting said output value from said diaphragm signal forming circuit into a digital value;

(e) a diaphragm control mechanism for defining the value of a diaphragm aperture, said mechanism defining the value of said diaphragm aperture in predetermined diaphragm step units;

(f) a first counter for memorizing that part of said digital value which corresponds to a number of step units within an accuracy of adjustment of said diaphragm control mechanism so that the part of the digital value of the analogue-to-digital conversion circuit corresponding to the step number is memorized in the first counter;

(g) a second counter for memorizing the part of said digital value other than that memorized in said first counter so that a digital value corresponding to the other part of the digital value of the analogue-to-digital conversion circuit is memorized in the second counter;

(h) a diaphragm control circuit connected to the first counter for controlling said diaphragm control mechanism based on the digital value memorized in said first counter, irrespective of the digital value memorized in the second counter;

(i) a pulse signal forming circuit for producing pulses of a predetermined constant period, said second counter being arranged predetermined constant period, said second counter being arranged for counting the pulses from said pulse signal forming circuit upon attainment of the content of said second counter of a predetermined value to produce an output; and (j) a shutter mechanism responsive to the output of said second counter for closing a shutter.

7. An exposure device for a camera, comprising:

(a) a light measuring circuit for producing an output corresponding to the brightness of an object;

(b) shutter speed input means for presetting shutter speed information;

(c) a diaphragm signal forming circuit for producing an output corresponding to the output of said light measuring circuit and the shutter speed information of said shutter speed input means;
(d) a diaphragm control mechanism for setting a diaphragm to one of a plurality of discrete positions;
(e) a memory circuit for memorizing the output of said diaphragm signal forming circuit, said memory circuit having a first memory portion for memorizing a first value corresponding to one of the discrete positions of said diaphragm and a second memory portion for memorizing a remainder value corresponding to positions between the discrete positions so that the first part of a digital value representative of the output of said diaphragm signal forming circuit and the remainder part are separately memorized in the first and second memory portions;
(f) a diaphragm control circuit connected to the first memory portion of the memory circuit for controlling the diaphragm control mechanism on the basis of said first value of said first memory portion, irrespective of the value memorized in the second memory portion; and
(g) a shutter control circuit connected between the shutter speed input means and the second memory portion for controlling the shutter time on the basis of said shutter speed information from the shutter speed input means and the remainder values memorized in the second memory portion, irrespective of the first value memorized in the first memory portion.

8. An exposure control device for a camera comprising:
(a) a light measuring circuit for producing an output corresponding to an object brightness;
(b) exposure factor setting means for entering first exposure factor information;
(c) a computing circuit for computing a second exposure factor information for a proper exposure on the basis of the output of the light measuring circuit and the first exposure factor information set by the exposure factor means;
(d) a memory circuit connected to the computing circuit for memorizing outputs of the computing circuit, said memory circuit having first and second memory portions for dividedly memorizing the second exposure factor information calculated by the computing circuit;
(e) first adjustable exposure regulating means coupled to the setting means and the second memory portion to establish a first exposure factor value on the basis of the entered first exposure factor information and the second exposure factor information memorized in the second memory portion; and
(f) second adjustable exposure regulating means coupled to the first memory portion to establish a second exposure factor value on the basis of the second exposure factor information memorized in the first memory portion, irrespective of the second exposure factor information memorized in the second memory portion.

9. An exposure control device comprising:
(a) a light measuring circuit for producing an output corresponding to an object brightness;
(b) exposure factor setting means for entering first exposure factor information;
(c) a computing circuit for computing a second exposure factor information for a proper exposure on the basis of the output of the light measuring circuit and the first exposure factor information set by the exposure factor setting means, said computing circuit being arranged for producing the second exposure factor information in digital form;
(d) first adjustable exposure factor regulating means coupled to the setting means to regulate the first exposure factor information directly on the basis of said first exposure factor information;
(e) second adjustable exposure factor regulating means to regulate the second exposure factor information, said second regulating means having a predetermined degree of control accuracy and being responsive to the second exposure factor information corresponding to a predetermined degree of control accuracy; and
(f) a memory circuit connected to the computer circuit and having a first memory portion for memorizing a portion of the second exposure factor information corresponding to the predetermined degree of control accuracy of the second adjustable exposure factor regulating means, and a second memory portion for memorizing the remaining portion of the information so as to dividedly memorize the portions in the first and second memory portions;
(g) said second adjustable exposure factor regulating means being coupled to the first memory portion to control the second exposure factor on the basis of the portion of the second exposure factor information memorized in the first memory portion, irrespective of the portion of the second exposure factor information memorized in the second memory portion;
(h) the first adjustable exposure factor regulating means being coupled to the second memory portion to establish a first exposure factor value on the basis of the first exposure factor information set in the setting means and the portion of the second exposure factor memorized in the second memory portion.

10. A camera comprising:
(a) a light measuring circuit;
(b) shutter speed input means;
(c) diaphragm signal forming means for forming a digital signal corresponding to a brightness information from the light measuring circuit and of shutter speed preset information from the shutter speed input means, said digital signal representing a digital value of a plurality of bits;
(d) a memory circuit having a first memory portion for memorizing a digital value of predetermined high order representing a value larger than a predetermined unit and a second memory portion for memorizing a digital value of the remaining low order bits, said first and second memory portions memorizing the digital value separately;
(e) a diaphragm control mechanism for defining the value of a diaphragm aperture, said mechanism having a predetermined diaphragm control accuracy and regulating the aperture value in predetermined diaphragm step units corresponding to the given accuracy, the digital value of the high order predetermined bits corresponding to the diaphragm step units;
(f) a diaphragm control circuit connected to the first memory portion of the memory circuit for controlling said diaphragm control mechanism in accordance with the digital value memorized in said first memory portion, irrespective of the digital value memorized in the second memory portion; and (g) a shutter time control circuit for controlling the shutteer time in accordance with the digital value memorized in said second memory portion and said shutter speed information in said shutter speed input means, irrespective of the digital value memorized in said first memory portion.

* * * * *